United States Patent
Yuan et al.

(10) Patent No.: US 12,520,301 B2
(45) Date of Patent: Jan. 6, 2026

(54) OVERLAPPING AN UPLINK DYNAMIC GRANT WITH A CONFIGURED UPLINK TRANSMISSION

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Kiran Venugopal, Green Brook, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 17/798,814

(22) PCT Filed: Feb. 13, 2020

(86) PCT No.: PCT/CN2020/075001
§ 371 (c)(1),
(2) Date: Aug. 10, 2022

(87) PCT Pub. No.: WO2021/159366
PCT Pub. Date: Aug. 19, 2021

(65) Prior Publication Data
US 2023/0138985 A1  May 4, 2023

(51) Int. Cl.
*H04W 72/1268*  (2023.01)
*H04L 1/00*  (2006.01)
*H04W 72/53*  (2023.01)

(52) U.S. Cl.
CPC ....... *H04W 72/1268* (2013.01); *H04L 1/0013* (2013.01); *H04W 72/53* (2023.01)

(58) Field of Classification Search
CPC .. H04W 72/1268; H04W 72/53; H04L 1/0013
See application file for complete search history.

(56) References Cited

U.S. PATENT DOCUMENTS

2012/0327821 A1* 12/2012 Lin ............... H04L 5/0094
 370/280
2016/0095104 A1* 3/2016 Chen ............. H04L 5/0048
 370/329

(Continued)

FOREIGN PATENT DOCUMENTS

| CN | 107786312 A | 3/2018 |
| CN | 110139363 A | 8/2019 |

OTHER PUBLICATIONS

Ericsson: "On Intra-UE Prioritization Enablers," 3GPP Draft, 3GPP TSG RAN WG1 Meeting #97, R1-1906097, On Intra-UE Prioritization Enablers, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 4, 2019 (May 4, 2019), XP051708139, 11 Pages, Retrieved from the Internet: URL: http://www.3gpp.org/ftp/tsg%5Fran/WG1%5FRL1/TSGR1%5F97/Docs/R1%2D1906097%2Ezip [retrieved on May 4, 2019] Section 2.2, p. 3-p. 4.

(Continued)

*Primary Examiner* — Jael M Ulysse
(74) *Attorney, Agent, or Firm* — Harrity & Harrity, LLP/ QUALCOMM Incorporated

(57) ABSTRACT

Various aspects of the present disclosure generally relate to wireless communication. In some aspects, a user equipment (UE) may receive a dynamic grant for an uplink transmission that overlaps with a configured uplink transmission. The UE may transmit the uplink transmission punctured in the configured uplink transmission based at least in part on receiving the dynamic grant. Numerous other aspects are provided.

30 Claims, 9 Drawing Sheets

(56) References Cited

U.S. PATENT DOCUMENTS

| | | | |
|---|---|---|---|
| 2018/0027582 A1* | 1/2018 | Yerramalli | H04L 5/005 370/336 |
| 2018/0049229 A1* | 2/2018 | Dinan | H04L 1/1896 |
| 2018/0092083 A1 | 3/2018 | Agarwal et al. | |
| 2018/0098223 A1* | 4/2018 | Hugl | H04L 5/001 |
| 2018/0124815 A1* | 5/2018 | Papasakellariou | H04W 72/1268 |
| 2018/0310333 A1* | 10/2018 | Akkarakaran | H04W 72/23 |
| 2018/0332577 A1* | 11/2018 | Yang | H04L 5/0055 |
| 2018/0352537 A1* | 12/2018 | Zhang | H04W 72/04 |
| 2019/0044639 A1* | 2/2019 | Ouchi | H04W 72/23 |
| 2019/0045546 A1* | 2/2019 | Li | H04L 5/0073 |
| 2019/0104477 A1* | 4/2019 | MolavianJazi | H04L 5/0023 |
| 2019/0149269 A1* | 5/2019 | Chatterjee | H04L 5/0094 370/329 |
| 2019/0215862 A1* | 7/2019 | Kim | H04W 72/23 |
| 2019/0268935 A1* | 8/2019 | Talarico | H04L 1/1822 |
| 2019/0313436 A1* | 10/2019 | Lee | H04L 5/0094 |
| 2019/0327755 A1* | 10/2019 | Xiong | H04L 5/0046 |
| 2019/0363843 A1* | 11/2019 | Gordaychik | H04L 1/1835 |
| 2020/0154496 A1* | 5/2020 | Yi | H04W 72/56 |
| 2020/0228248 A1* | 7/2020 | Islam | H04L 5/0055 |
| 2020/0229104 A1* | 7/2020 | MolavianJazi | H04W 52/54 |
| 2020/0252168 A1* | 8/2020 | Kim | H04W 72/1268 |
| 2020/0314883 A1* | 10/2020 | Chin | H04L 5/0094 |
| 2020/0322971 A1* | 10/2020 | Jung | H04W 72/1268 |
| 2020/0351931 A1* | 11/2020 | Babaei | H04W 52/365 |
| 2021/0022087 A1* | 1/2021 | Saber | H04L 5/0032 |
| 2021/0045070 A1* | 2/2021 | Yi | H04W 72/0446 |
| 2022/0007308 A1* | 1/2022 | Xiong | H04W 52/38 |
| 2022/0167335 A1* | 5/2022 | Go | H04W 72/046 |
| 2022/0256562 A1* | 8/2022 | Behravan | H04W 72/569 |

OTHER PUBLICATIONS

Ericsson: "On Intra-UE Prioritization Enablers", 3GPP Draft, R1-1904130, 3GPP TSG RAN WG1 Meeting #96 bis, On Intra-UE Prioritization Enablers, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 3, 2019 (Apr. 3, 2019), XP051707131, 10 Pages, Retrieved from the Internet: URL: http://www.3gpp.org/ftp/tsg%5Fran/WG1%5FRL1/TSGR1%5F96b/Docs/R1%2D1904130%2Ezip [retrieved on Apr. 3, 2019] Section 2.4, p. 8.

International Search Report and Written Opinion—PCT/CN2020/075001—ISA/EPO—Nov. 17, 2020.

Nokia., et al., "UL Inter-UE eMBB and URLLC Multiplexing Enhancements", 3GPP TSG RAN WG1 Meeting #97, R1-1906756, Reno, USA, May 13-17, 2019, May 17, 2019, 13 Pages, The Whole Document.

Ericsson: "Other Enhancements to Uplink and Downlink Transmissions for NR URLLC—Response to Incoming LS", R1-1908127, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, XP051764745, pp. 1-10, The Whole Document.

Nokia, "Scenarios for Intra-UE Prioritization/Multiplexing", 3GPP TSG-RAN WG2 Meeting #103bis, R2-1814995, 3rd Generation Partnership Project, Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 28, 2018, 4 Pages, XP051524368, The whole document.

Nokia, et al., "On Resource Conflicts Between UL Grants", 3GPP TSG RAN WG1 Meeting #97, R1-1906753, 3rd Generation Partnership Project, Mobile Competence Centre, 650, Route Des Lucioles, F-06921 Sophia-Antipolis Cedex, France, vol. RAN WG1, No. Reno, Nevada, US, May 13, 2019-May 17, 2019, May 13, 2019, 03 Pages, XP051728204, The whole document.

NTT Docomo, et al., "Intra-UE Prioritization and Multiplexing", 3GPP TSG-RAN WG2 Meeting #106, R2-1906090, 3rd Generation Partnership Project, Mobile Competence Centre, 650, Route Des Lucioles, F-06921 Sophia-Antipolis Cedex, France, vol. RAN WG2, No. Reno, USA, May 13, 2019-May 17, 2019, May 13, 2019, 06 Pages, XP051729567, The whole document.

NTT Docomo Inc: "UL Intra-UE Transmission Prioritization/Multiplexing", R1-1902810, 3GPP TSG RAN WG1 #96, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051600505, 6 Pages, The Whole Document.

Spreadtrum Communications: "Handling for Resource Collision of Equal Priority", 3GPP TSG-RAN WG2 Meeting #107, R2-1909101, 3rd Generation Partnership Project, Mobile Competence Centre, 650, Route Des Lucioles, F-06921 Sophia-Antipolis Cedex, France, vol. RAN WG2, No. Prague, CZ, Aug. 26, 2019-Aug. 30, 2019, Aug. 15, 2019, 03 Pages, XP051766911, The whole document.

Supplementary European Search Report—EP20918579—Search Authority—Munich—Sep. 10, 2023.

* cited by examiner

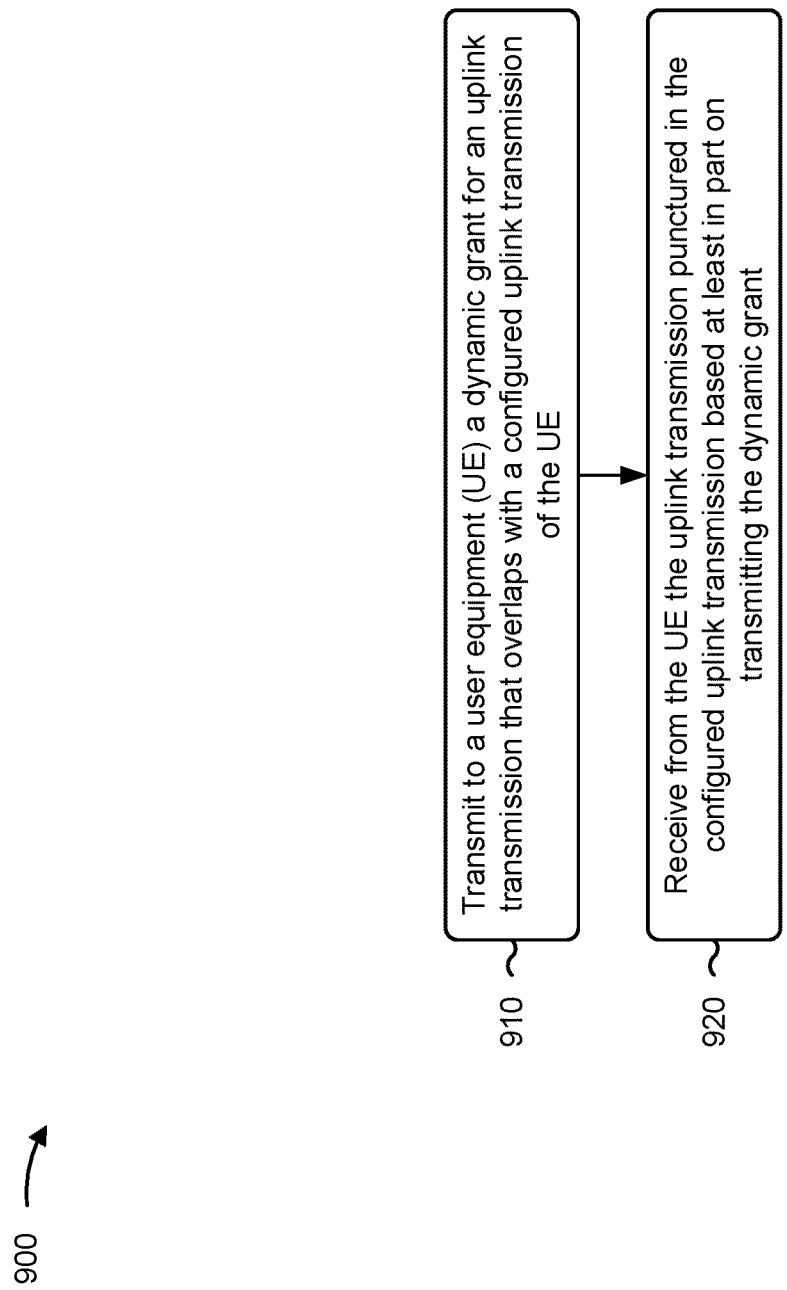

OVERLAPPING AN UPLINK DYNAMIC GRANT WITH A CONFIGURED UPLINK TRANSMISSION

CROSS-REFERENCE TO RELATED APPLICATION

This Patent Application is a 371 national stage of PCT Application No. PCT/CN2020/075001 filed on Feb. 13, 2020, entitled "OVERLAPPING AN UPLINK DYNAMIC GRANT WITH A CONFIGURED UPLINK TRANSMISSION," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for scheduling an uplink transmission.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a dynamic grant for an uplink transmission that overlaps with a configured uplink transmission. The method may include transmitting the uplink transmission punctured in the configured uplink transmission based at least in part on receiving the dynamic grant.

In some aspects, a method of wireless communication, performed by a base station (BS), may include transmitting to a UE a dynamic grant for an uplink transmission that overlaps with a configured uplink transmission of the UE. The method may include receiving from the UE the uplink transmission punctured in the configured uplink transmission based at least in part on transmitting the dynamic grant.

In some aspects, a UE for wireless communication may include a memory and one or more processors coupled to the memory. The memory and the one or more processors may be configured to receive a dynamic grant for an uplink transmission that overlaps with a configured uplink transmission. The memory and the one or more processors may be configured to transmit the uplink transmission punctured in the configured uplink transmission based at least in part on receiving the dynamic grant.

In some aspects, a BS for wireless communication may include a memory and one or more processors coupled to the memory. The memory and the one or more processors may be configured to transmit to a UE a dynamic grant for an uplink transmission that overlaps with a configured uplink transmission of the UE. The memory and the one or more processors may be configured to receive from the UE the uplink transmission punctured in the configured uplink transmission based at least in part on transmitting the dynamic grant.

In some aspects, a non-transitory computer-readable medium may store one or more instructions for wireless communication. The one or more instructions, when executed by one or more processors of a UE, may cause the one or more processors to receive a dynamic grant for an uplink transmission that overlaps with a configured uplink transmission. The one or more instructions may cause the one or more processors to transmit the uplink transmission punctured in the configured uplink transmission based at least in part on receiving the dynamic grant.

In some aspects, a non-transitory computer-readable medium may store one or more instructions for wireless communication. The one or more instructions, when executed by one or more processors of a BS, may cause the one or more processors to transmit to a UE a dynamic grant for an uplink transmission that overlaps with a configured uplink transmission of the UE. The one or more instructions may cause the one or more processors to receive from the UE the uplink transmission punctured in the configured uplink transmission based at least in part on transmitting the dynamic grant.

In some aspects, an apparatus for wireless communication may include means for receiving a dynamic grant for an uplink transmission that overlaps with a configured uplink transmission. The apparatus may include means for transmitting the uplink transmission punctured in the configured uplink transmission based at least in part on receiving the dynamic grant.

In some aspects, an apparatus for wireless communication may include means for transmitting to a UE a dynamic grant for an uplink transmission that overlaps with a configured uplink transmission of the UE. The apparatus may include means for receiving from the UE the uplink transmission punctured in the configured uplink transmission based at least in part on transmitting the dynamic grant.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a BS, in accordance with various aspects of the present disclosure.

DETAILED DESCRIPTION

Figure 1:
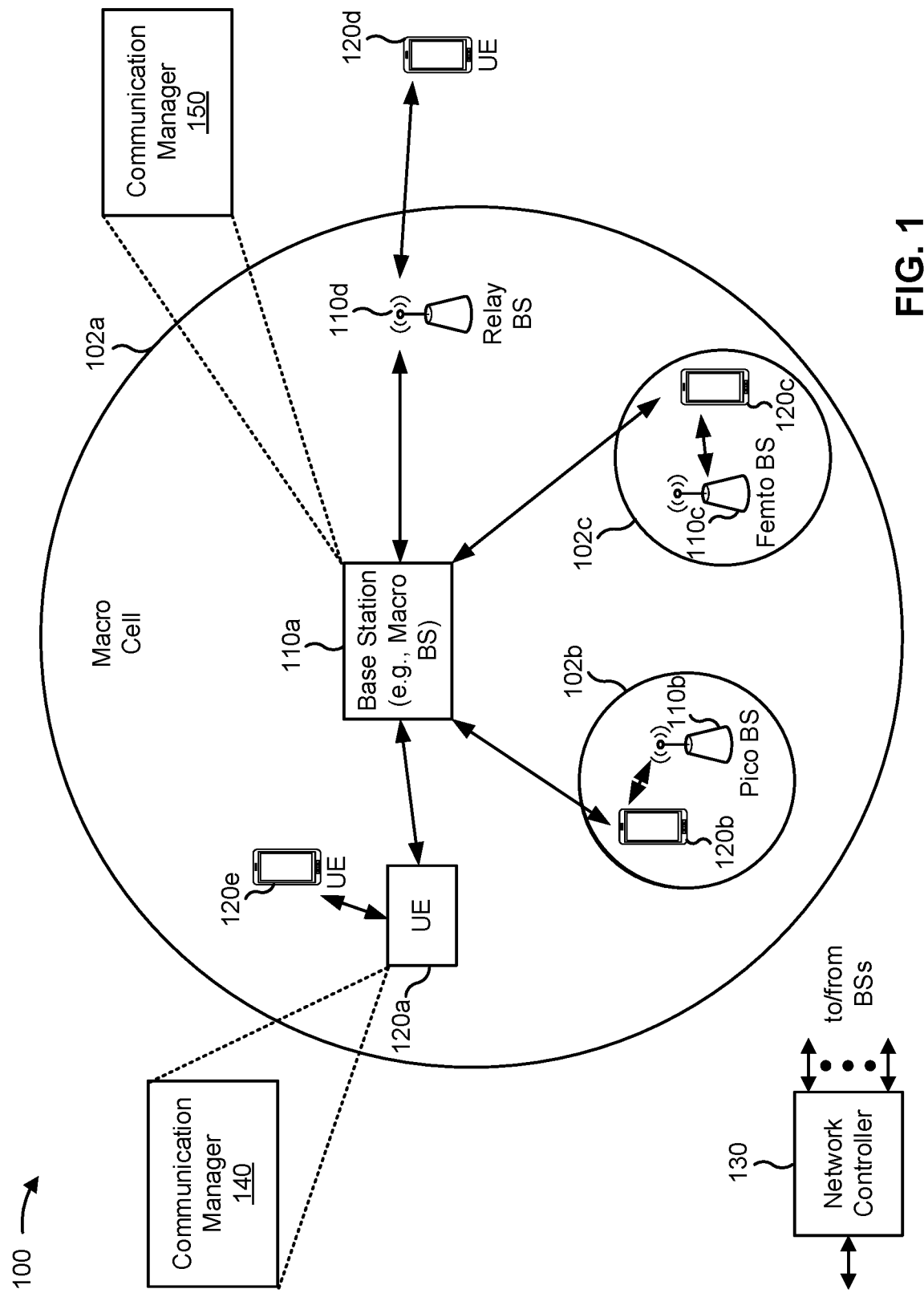
FIG. 1 is a block diagram conceptually illustrating an example of a wireless communication network, in accordance with various aspects of the present disclosure.

A user equipment (UE) may be configured with a beam that is to be used for transmitting a configured uplink transmission. In some cases, the beam may not be permitted for use in transmitting the configured uplink transmission, such as when the beam is directed toward a human body. As a result, an uplink performance of the UE may be impaired, and configuration of a new beam for the UE may be associated with latencies that further impair uplink performance. According to some techniques and apparatuses described herein, a UE may receive a dynamic grant for an uplink transmission that overlaps with a configured uplink transmission that is to be transmitted on a beam that is not permitted for use. Accordingly, the UE may transmit the uplink transmission punctured in the configured uplink transmission. In this way, uplink performance of the UE may be improved.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of base stations (BSs) 110 (shown as BS 110*a*, BS 110*b*, BS 110*c*, and BS 110*d*) and other network entities. A BS is an entity that communicates with UEs and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may receive a dynamic grant for an uplink transmission that overlaps with a configured uplink transmission, transmit the uplink transmission punctured in the configured uplink transmission based at least in part on receiving the dynamic grant, and/or the like. Additionally, or alternatively, the communication manager 140 may perform one or more other operations described herein.

Similarly, the base station 110 may include a communication manager 150. As described in more detail elsewhere herein, the communication manager 150 may transmit to a UE a dynamic grant for an uplink transmission that overlaps with a configured uplink transmission of the UE, receive from the UE the uplink transmission punctured in the configured uplink transmission based at least in part on transmitting the dynamic grant, and/or the like. Additionally, or alternatively, the communication manager 150 may perform one or more other operations described herein.

As indicated above, FIG. 1 is provided merely as an example. Other examples may differ from what is described with regard to FIG. 1.

Figure 2:
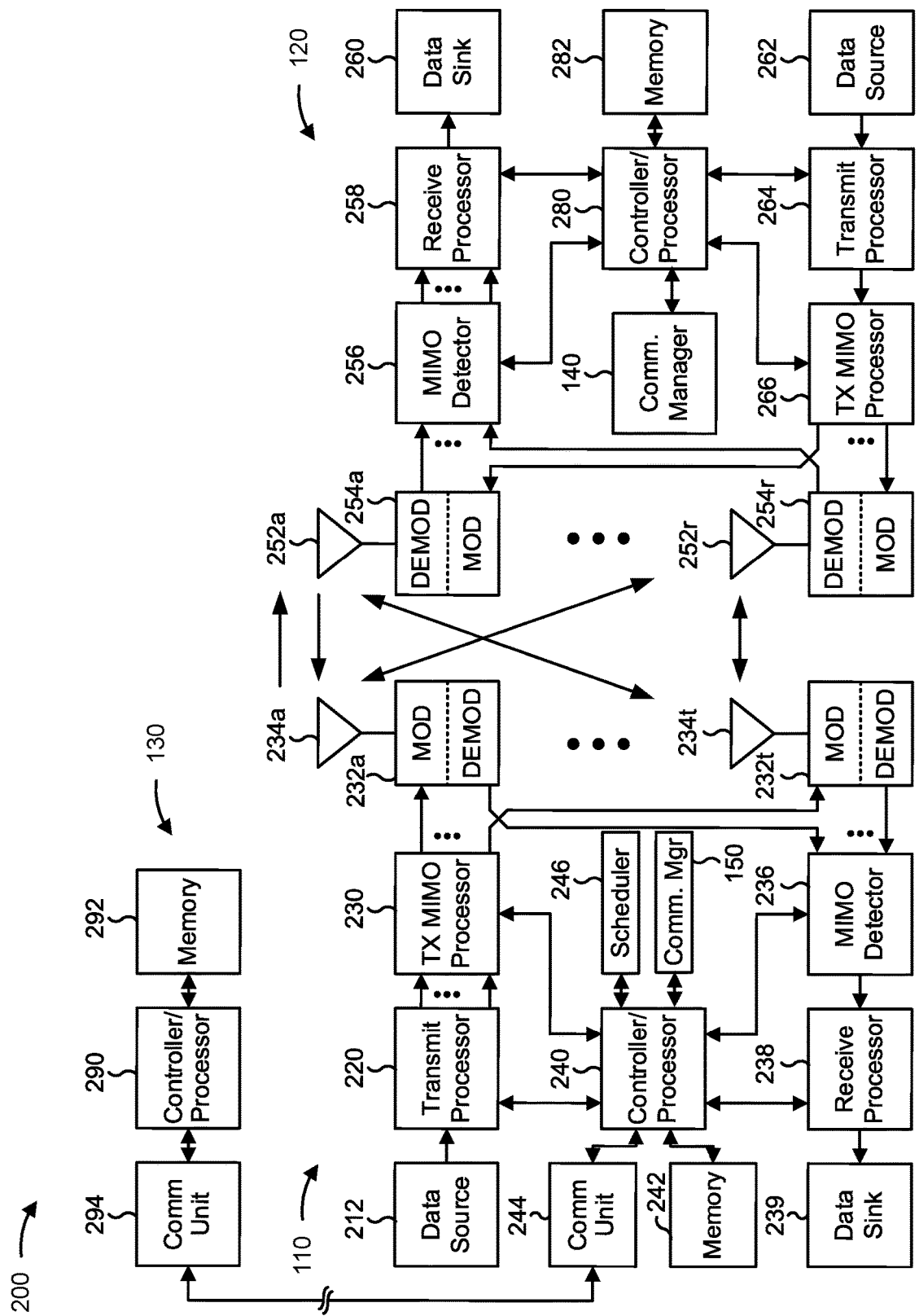
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with overlapping an uplink dynamic grant with a configured uplink transmission, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for receiving a dynamic grant for an uplink transmission that overlaps with a configured uplink transmission, means for transmitting the uplink transmission punctured in the configured uplink transmission based at least in part on receiving the dynamic grant, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

In some aspects, the base station 110 may include means for transmitting to a UE a dynamic grant for an uplink transmission that overlaps with a configured uplink transmission of the UE, means for receiving from the UE the uplink transmission punctured in the configured uplink transmission based at least in part on transmitting the dynamic grant, and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

As indicated above, FIG. 2 is provided merely as an example. Other examples may differ from what is described with regard to FIG. 2.

Figure 3:
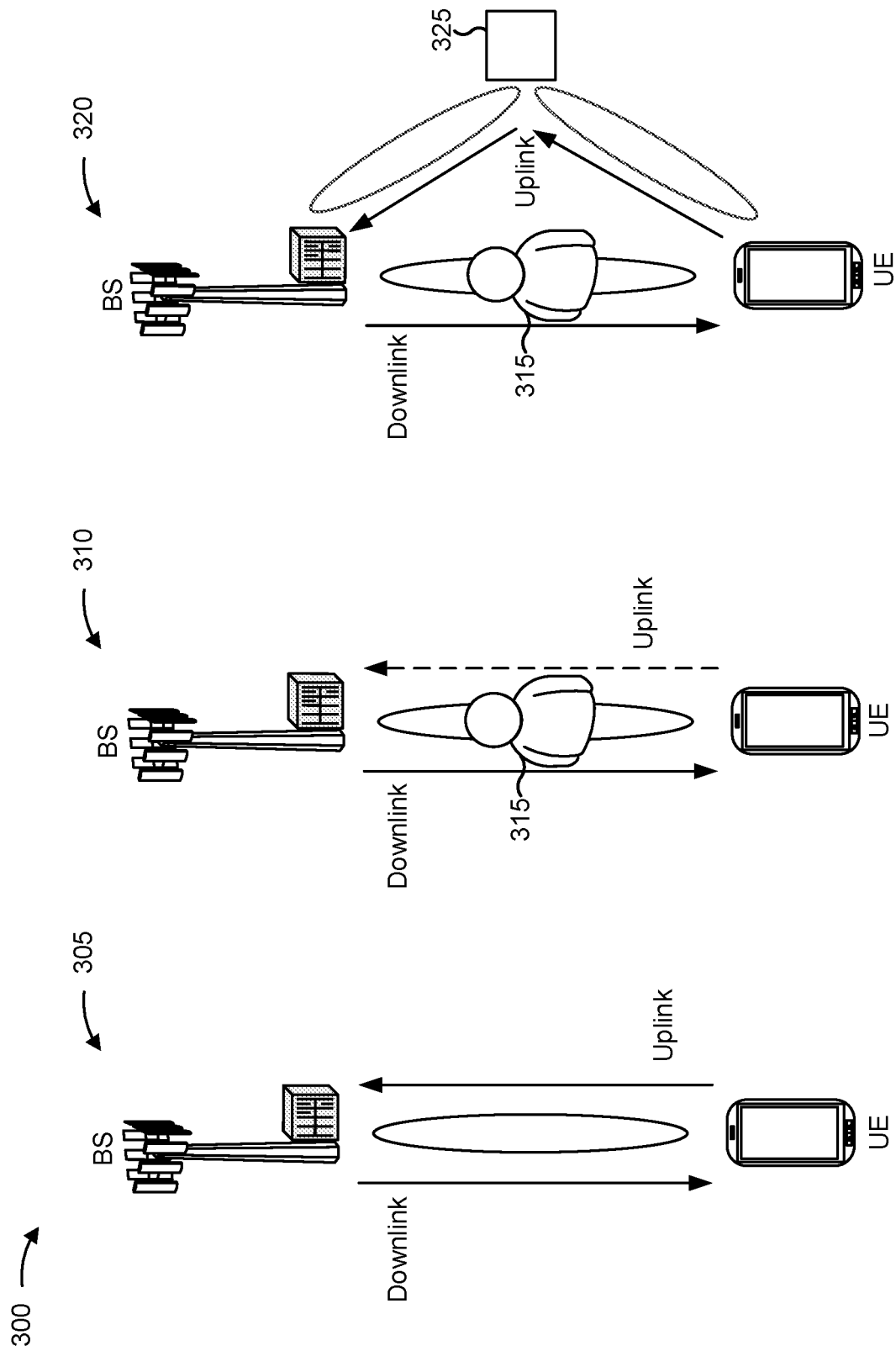
FIGS. 3 and 4 are diagrams illustrating examples of communication involving a maximum permissible exposure event.

FIG. 3 is a diagram illustrating an example 300 of communication involving a maximum permissible exposure (MPE) event, in accordance with various aspects of the present disclosure. As shown in FIG. 3, a UE and a BS may be capable of communicating via one or more beams, and a communication via a beam may take multiple different paths to reach a receiver. In some cases, a beam may be a millimeter wave (mmWave) beam that carries a communication in the mmWave frequency band. When transmitting in the mmWave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher for mmWave communications as compared to sub-6 GHz communications. To improve safety, some governing bodies have placed restrictions on the peak EIRP that can be directed toward the human body. These restrictions are sometimes referred to as MPE limitations, MPE constraints, and/or the like.

As shown in FIG. 3, and by reference number 305, the UE may communicate with the BS using an uplink beam and/or a downlink beam. In some cases, the uplink beam used by the UE may not be directed toward a human body, or the like, and therefore may not be subject to an MPE condition.

As shown by reference number 310, the uplink beam used by the UE to transmit an uplink communication may become subject to an MPE condition. For example, the uplink beam may become subject to the MPE condition upon the occurrence of an MPE event. The MPE event may be a human body 315, or the like, blocking the beam (i.e., the beam used by the UE to transmit the uplink transmission may be directed toward the human body 315). That is, the human body 315 may block or obstruct communications to and/or from an antenna subarray of the UE, or may otherwise be positioned near the antenna subarray. In this case, the downlink beam may be suitable for use by the UE to communicate with the BS, but the uplink beam may not be permitted for use when the uplink beam is subject to the MPE condition.

As shown by reference number 320, in some aspects, the UE may transmit an uplink transmission using a different beam than the beam that is subject to the MPE condition. For example, the UE may use a beam directed toward an object 325 that provides a path to the BS that is not blocked by the human body 315.

As indicated above, FIG. 3 is provided as an example. Other examples may differ from what is described with respect to FIG. 3.

Figure 4:
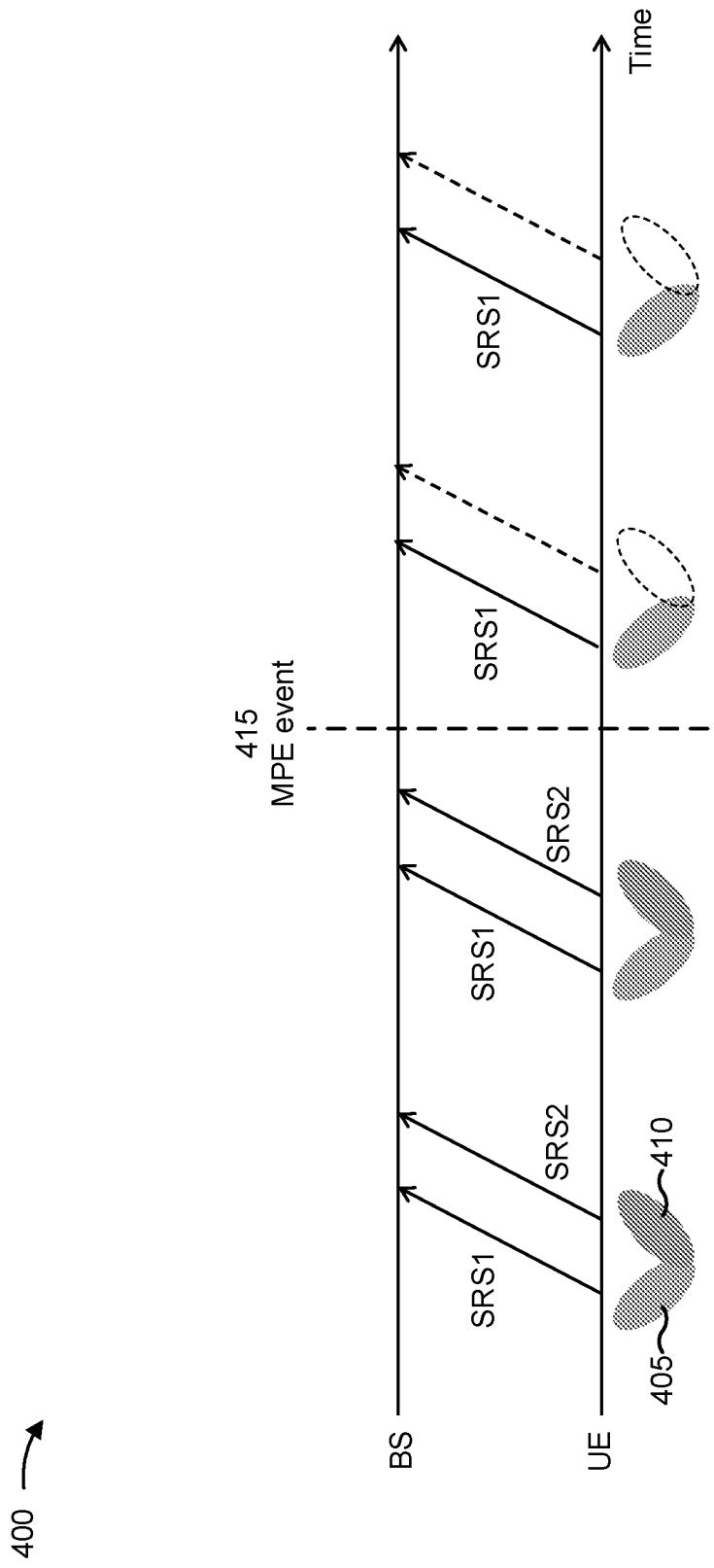

FIG. 4 is a diagram illustrating an example 400 of communication involving an MPE event, in accordance with various aspects of the present disclosure. As shown in FIG. 4, a UE may transmit a first uplink transmission, such as a first SRS (SRS1), using a first beam 405, and a second uplink transmission, such as a second SRS (SRS2), using a second beam 410. In some cases, an MPE event 415 may occur with respect to a beam used by the UE. For example, the second beam 410 may be directed toward a human body, and thus the second beam 410 may be subject to an MPE condition. As shown in FIG. 4, the UE may discontinue use of the second beam 410 for transmitting the second SRS when the second beam 410 is subject to the MPE condition.

As a result of the MPE condition, an uplink performance of the UE may be impaired. Moreover, reconfiguration (e.g., radio resource control (RRC) reconfiguration) of a new beam for the UE may be associated with latencies that further impair the uplink performance of the UE. According to some techniques and apparatuses described herein, a UE may receive a dynamic grant for an uplink transmission that overlaps with a configured uplink transmission (e.g., an SRS transmission on a beam that is subject to an MPE condition). Accordingly, the UE may transmit the uplink transmission punctured in the configured uplink transmission. In this way, uplink performance of the UE may be improved, such as when a beam of the UE is subject to an MPE condition.

As indicated above, FIG. 4 is provided as an example. Other examples may differ from what is described with respect to FIG. 4.

Figure 5:
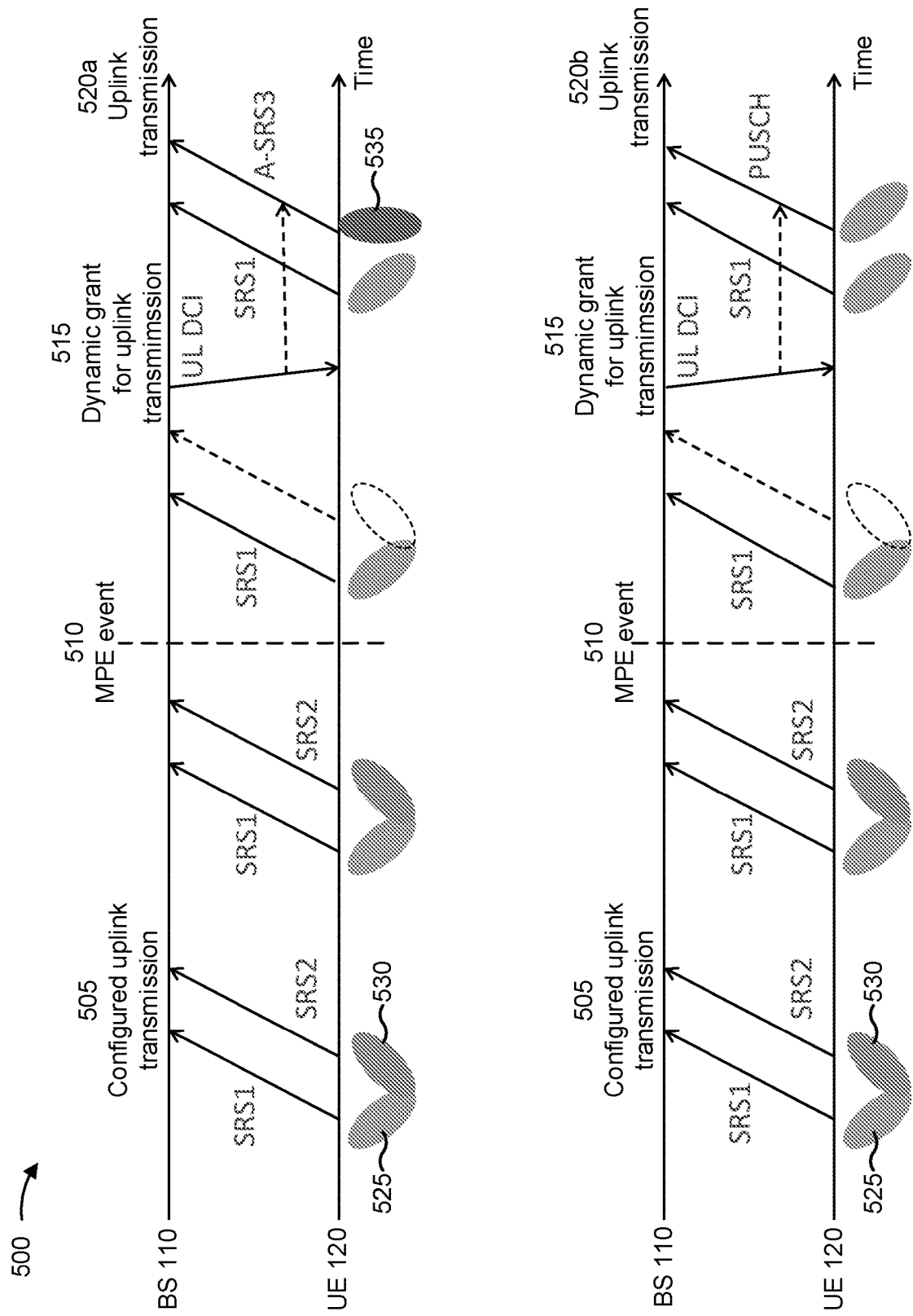
FIGS. 5-7 are diagrams illustrating examples of overlapping an uplink dynamic grant with a configured uplink transmission.

FIG. 5 is a diagram illustrating an example 500 of overlapping an uplink dynamic grant with a configured uplink transmission, in accordance with various aspects of the present disclosure. As shown in FIG. 5, a BS 110 and a UE 120 may communicate in connection with one or more uplink transmissions.

As shown by reference number 505, the UE 120 may transmit, and the BS 110 may receive, a series of configured uplink transmissions. A configured uplink transmission may be a periodic SRS, a semi-periodic SRS, a type-1 configured grant physical uplink shared channel (PUSCH) communication, or a physical uplink control channel (PUCCH) communication. For example, as shown, the UE 120 may periodically transmit a first SRS (SRS1) using a first beam 525 and a second SRS (SRS2) using a second beam 530. Such configured uplink transmissions may be configured by higher layer signaling, such as by RRC signaling, from the BS 110 to the UE 120. Moreover, such configured uplink transmissions may be modified, for example by RRC reconfiguration (which may be associated with significant latency).

As shown in FIG. 5, an MPE event 510 may occur during communication of the series of configured uplink transmissions. As described above, the MPE event 510 may be a human body blocking a beam of the UE 120. Accordingly, the beam to which the MPE event 510 relates may be subject to an MPE condition, and therefore not permitted for use by the UE 120. For example, as shown, the second beam 530 may be subject to an MPE condition, and therefore not permitted for use by the UE 120. In this case, the UE 120 may continue to transmit the first SRS using the first beam 525, and may discontinue transmitting the second SRS using the second beam 530.

In some aspects, the UE 120 may determine that a beam (e.g., the second beam 530) is not to be used due to the MPE condition. That is, the UE 120 may determine that the beam is subject to the MPE condition, and therefore not permitted for use by the UE 120. In some aspects, the UE 120 may detect the MPE event 510, to thereby determine that the beam is subject to the MPE condition. For example, the UE 120 may detect that the beam is directed at a human body (e.g., using ultrasound, or the like). In some aspects, the UE 120 may transmit, and the BS 110 may receive, an indication that the beam (e.g., the second beam 530) is not to be used by the UE 120 due to being subject to the MPE condition. In some aspects, the indication also may identify another beam that the UE 120 could use instead of the beam subject to the MPE condition.

As shown by reference number 515, the BS 110 may transmit, and the UE 120 may receive, a dynamic grant for an uplink transmission. For example, the BS 110 may transmit the dynamic grant for the uplink transmission based at least in part on receiving the indication of the MPE condition from the UE 120. In some aspects, the uplink transmission may be a PUSCH communication, an aperiodic SRS, or a physical random access channel (PRACH) communication.

In some aspects, the BS 110 may transmit downlink control information (DCI) that indicates the dynamic grant for the uplink transmission. In some aspects, the DCI may also indicate a beam that the UE 120 is to use to transmit the uplink transmission.

The dynamic grant for the uplink transmission may overlap (e.g., in a time domain) with a particular configured uplink transmission. That is, the dynamic grant may overlap with a particular configured uplink transmission that is to be transmitted using the beam subject to the MPE condition. In some aspects, the dynamic grant (e.g., the DCI that indicates the dynamic grant) may be received by the UE 120 at least a threshold quantity of symbols before the particular configured uplink transmission, as described in connection with FIG. 6.

As shown by reference numbers 520a and 520b, the UE 120 may transmit, and the BS 110 may receive, the uplink transmission punctured in the particular configured uplink transmission according to the dynamic grant. As shown by reference number 520*a*, the uplink transmission may be an aperiodic SRS (A-SRS3), and the UE 120 may transmit the aperiodic SRS, punctured in the particular configured uplink transmission, using a third beam 535. As shown by reference number 520*b*, the uplink transmission may be a PUSCH communication, and the UE 120 may transmit the PUSCH communication, punctured in the particular configured uplink transmission, using the first beam 525. In some aspects, the UE 120 may partially puncture or fully puncture the configured uplink transmission, as described in connection with FIG. 7. In this way, the UE 120 may efficiently use time domain resources for uplink transmissions, thereby improving throughput and an uplink performance of the UE 120.

As indicated above, FIG. 5 is provided as an example. Other examples may differ from what is described with respect to FIG. 5.

Figure 6:
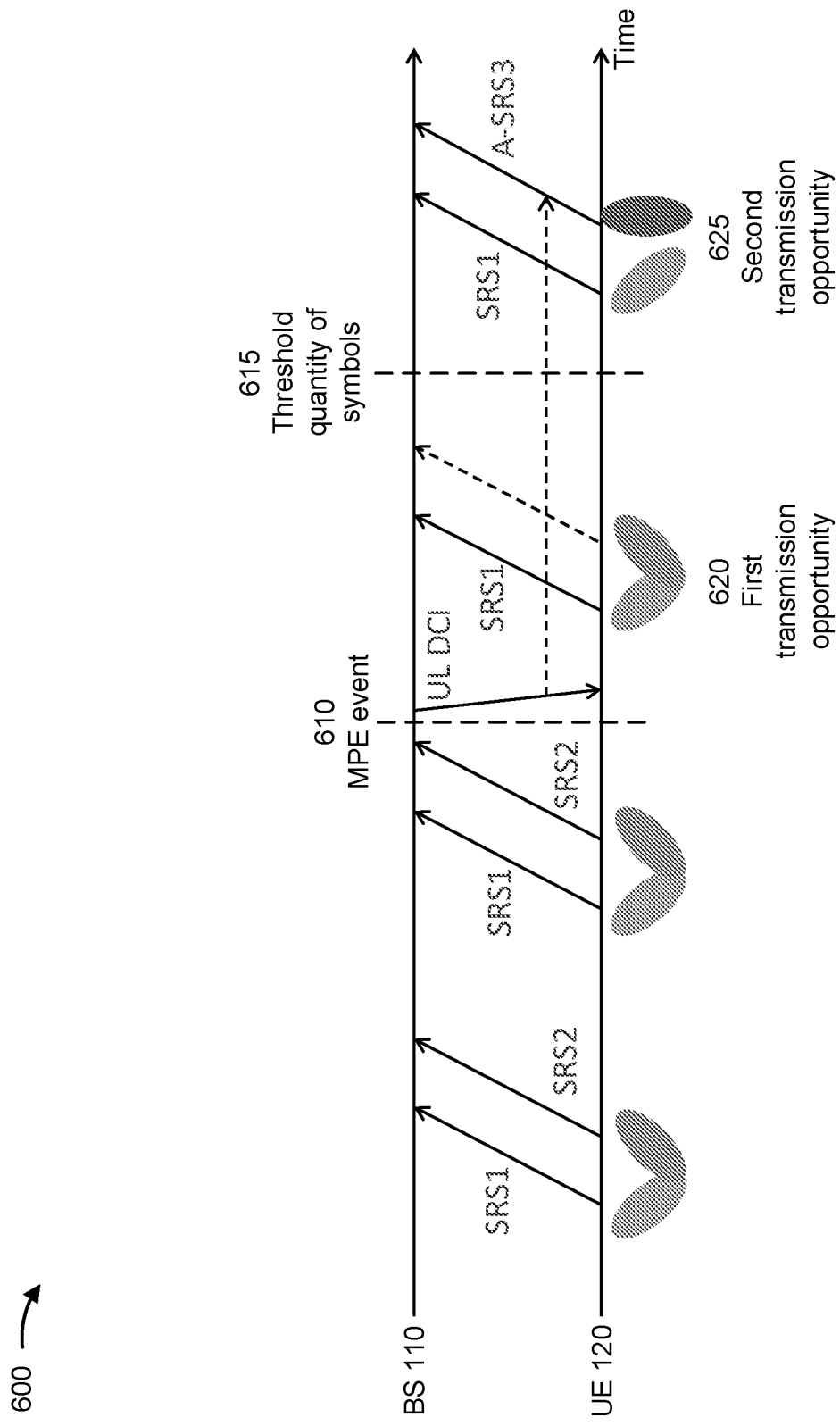

FIG. 6 is a diagram illustrating an example 600 of overlapping an uplink dynamic grant with a configured uplink transmission, in accordance with various aspects of the present disclosure. As shown in FIG. 6, a BS 110 and a UE 120 may communicate in connection with one or more uplink transmissions. For example, the BS 110 and the UE 120 may communicate in connection with a series of configured uplink transmissions using one or more beams, as described in connection with FIG. 5. A beam used by the UE 120 to transmit a configured uplink transmission may be subject to an MPE condition upon the occurrence of an MPE event 610, as described in connection with FIG. 5.

After the occurrence of the MPE event 610, the BS 110 may transmit, and the UE 120 may receive, DCI that indicates a dynamic grant for an uplink transmission that overlaps with a particular configured uplink transmission, as described in connection with FIG. 5. The DCI (e.g., the dynamic grant) may be received by the UE 120 a threshold quantity of symbols 615 before the particular configured uplink transmission is scheduled. Accordingly, a timing of a first transmission opportunity 620 after the DCI is received by the UE 120 may not satisfy the threshold quantity of symbols 615 and may not be used for the uplink transmission, while a timing of a second transmission opportunity 625 may satisfy the threshold quantity of symbols 615 and may be used for the uplink transmission.

In some aspects, the threshold quantity of symbols 615 may be a fixed value or a value that may be based at least in part on a numerology of a carrier (e.g., a carrier on which the UE 120 and the BS 110 are communicating). For example, the value may be based at least in part on a subcarrier spacing. In some aspects, the threshold quantity of symbols 615 may be based at least in part on a type of the uplink transmission (e.g., aperiodic SRS, PUSCH communication, or PRACH communication) and/or a capability of the UE 120. For example, the threshold quantity of symbols 615 may be greater than a quantity of symbols that is needed by the UE 120 to prepare an SRS (e.g., according to an SRS processing capability of the UE 120), a quantity of symbols that is needed by the UE 120 to prepare a PUSCH (e.g., according to a PUSCH processing capability of the UE 120), a quantity of symbols that is needed by the UE 120 to prepare a PRACH (e.g., according to a PRACH processing capability of the UE 120), and/or the like.

As indicated above, FIG. 6 is provided as an example. Other examples may differ from what is described with respect to FIG. 6.

Figure 7:
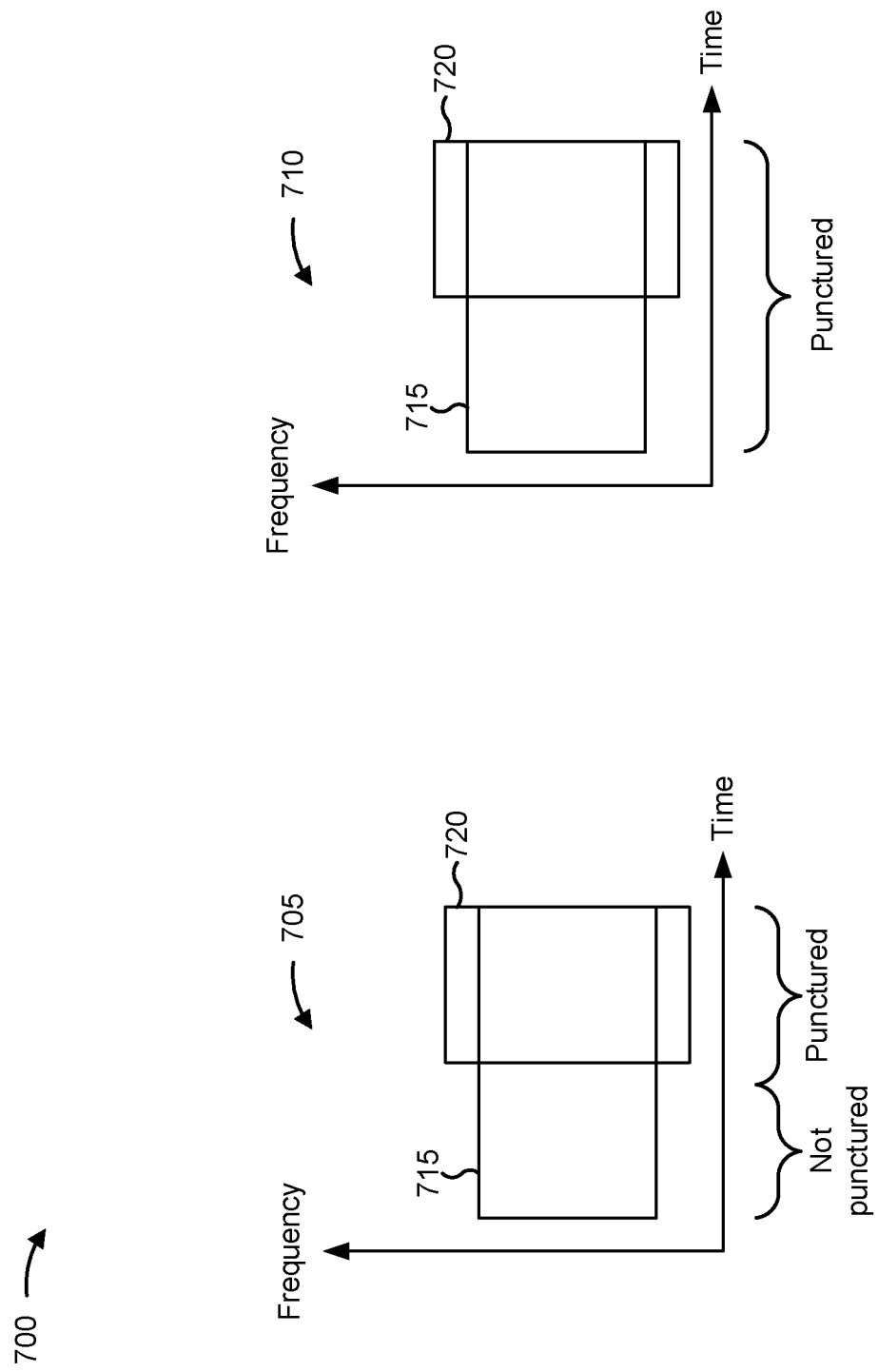

FIG. 7 is a diagram illustrating an example 700 of overlapping an uplink dynamic grant with a configured uplink transmission, in accordance with various aspects of the present disclosure. For example, as shown in FIG. 7, a dynamic grant for an uplink transmission 715 (e.g., a dynamic grant for an uplink transmission as described in connection with FIGS. 5 and 6) may overlap with a configured uplink transmission 720 (e.g., a configured uplink transmission as described in connection with FIGS. 5 and 6). Accordingly, the uplink transmission 715 may be punctured in the configured uplink transmission, as described above.

As shown by reference number 705, in some aspects, only resources (e.g., time domain resources, such as symbols) for the configured uplink transmission 720 that overlap with the dynamic grant for the uplink transmission 715 may be punctured (e.g., such that the non-punctured symbols for the configured uplink transmission 720 may be transmitted). For example, one or more symbols of the configured uplink transmission 720 that overlap with the dynamic grant for the uplink transmission 715 may be punctured, and one or more symbols of the configured uplink transmission 720 that do not overlap with the dynamic grant for the uplink transmission 715 may not be punctured. As shown by reference number 710, in some aspects, all resources (e.g., time domain resources) for the configured uplink transmission 720 may be punctured. For example, one or more symbols of the configured uplink transmission may be punctured regardless of whether the symbols overlap with the dynamic grant for the uplink transmission 715.

As indicated above, FIG. 7 is provided as an example. Other examples may differ from what is described with respect to FIG. 7.

Figure 8:
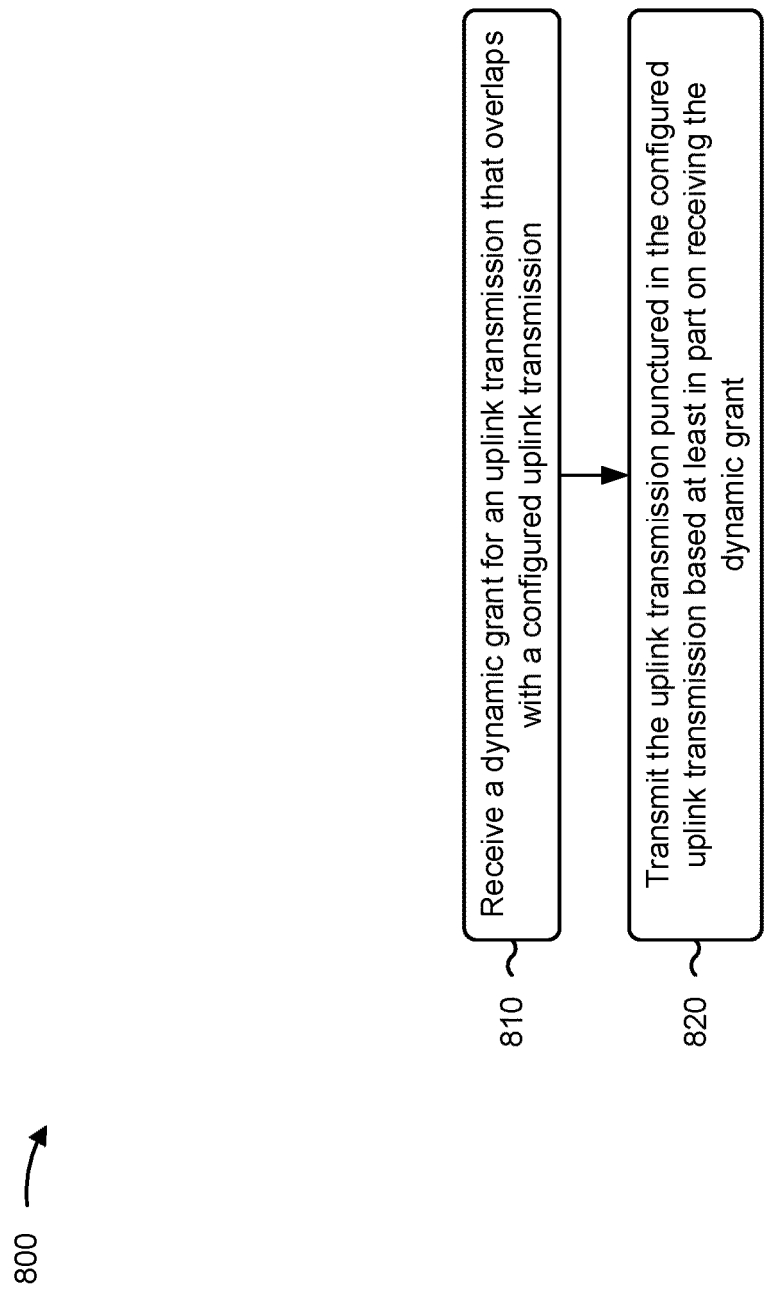
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120, and/or the like) performs operations associated with overlapping an uplink dynamic grant with a configured uplink transmission.

As shown in FIG. 8, in some aspects, process 800 may include receiving a dynamic grant for an uplink transmission that overlaps with a configured uplink transmission (block 810). For example, the UE (e.g., using antenna 252, DEMOD 254, MIMO detector 256, receive processor 258, controller/processor 280, and/or the like) may receive a dynamic grant for an uplink transmission that overlaps with a configured uplink transmission, as described above.

As further shown in FIG. 8, in some aspects, process 800 may include transmitting the uplink transmission punctured in the configured uplink transmission based at least in part on receiving the dynamic grant (block 820). For example, the UE (e.g., using controller/processor 280, transmit processor 264, TX MIMO processor 266, MOD 254, antenna 252, and/or the like) may transmit the uplink transmission punctured in the configured uplink transmission based at least in part on receiving the dynamic grant, as described above.

Process 800 may include additional aspects, such as any single aspect or any combination of aspects described below and/or in connection with one or more other processes described elsewhere herein.

In a first aspect, a beam for transmitting the configured uplink transmission is subject to an MPE condition. In a second aspect, alone or in combination with the first aspect, process 800 includes determining that a beam for the configured uplink transmission is not to be used, due to an MPE condition, and transmitting an indication that the beam is not to be used due to the MPE condition.

In a third aspect, alone or in combination with one or more of the first and second aspects, the uplink transmission is a PUSCH communication, an aperiodic SRS, or a PRACH communication. In a fourth aspect, alone or in combination with one or more of the first through third aspects, the configured uplink transmission is a periodic SRS, a semi-periodic SRS, a type-1 configured grant PUSCH communication, or a PUCCH communication.

In a fifth aspect, alone or in combination with one or more of the first through fourth aspects, one or more symbols of the configured uplink transmission that overlap with the dynamic grant for the uplink transmission are punctured, and one or more symbols of the configured uplink transmission that do not overlap with the dynamic grant for the uplink transmission are not punctured. In a sixth aspect, alone or in combination with one or more of the first through fifth aspects, all resources for the configured uplink transmission are punctured.

In a seventh aspect, alone or in combination with one or more of the first through sixth aspects, the dynamic grant is received at least a threshold quantity of symbols before the configured uplink transmission is scheduled. In an eighth aspect, alone or in combination with one or more of the first through seventh aspects, the threshold quantity of symbols is a fixed value or a value that is based at least in part on a numerology of a carrier. In a ninth aspect, alone or in combination with one or more of the first through eighth aspects, the threshold quantity of symbols is based at least in part on at least one of a type of the uplink transmission or a capability of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a BS, in accordance with various aspects of the present disclosure. Example process 900 is an example where the BS (e.g., BS 110, and/or the like) performs operations associated with overlapping an uplink dynamic grant with a configured uplink transmission.

As shown in FIG. 9, in some aspects, process 900 may include transmitting to a UE a dynamic grant for an uplink transmission that overlaps with a configured uplink transmission of the UE (block 910). For example, the BS (e.g., using controller/processor 240, transmit processor 220, TX MIMO processor 230, MOD 232, antenna 234, and/or the like) may transmit to a UE a dynamic grant for an uplink transmission that overlaps with a configured uplink transmission of the UE, as described above.

As further shown in FIG. 9, in some aspects, process 900 may include receiving from the UE the uplink transmission punctured in the configured uplink transmission based at least in part on transmitting the dynamic grant (block 920). For example, the BS (e.g., using antenna 234, DEMOD 232, MIMO detector 236, receive processor 238, controller/processor 240, and/or the like) may receive from the UE the uplink transmission punctured in the configured uplink transmission based at least in part on transmitting the dynamic grant, as described above.

Process 900 may include additional aspects, such as any single aspect or any combination of aspects described below and/or in connection with one or more other processes described elsewhere herein.

In a first aspect, a beam that the UE is to use for transmitting the configured uplink transmission is subject to an MPE condition. In a second aspect, alone or in combination with the first aspect, process 900 includes receiving an indication that a beam that the UE is to use for transmitting the configured uplink transmission is not to be used by the UE due to an MPE condition.

In a third aspect, alone or in combination with one or more of the first and second aspects, the uplink transmission is a PUSCH communication, an aperiodic SRS, or a PRACH communication. In a fourth aspect, alone or in combination with one or more of the first through third aspects, the configured uplink transmission is a periodic SRS, a semi-periodic SRS, a type-1 configured grant PUSCH communication, or a PUCCH communication.

In a fifth aspect, alone or in combination with one or more of the first through fourth aspects, one or more symbols of the configured uplink transmission that overlap with the dynamic grant for the uplink transmission are punctured, and one or more symbols of the configured uplink transmission that do not overlap with the dynamic grant for the uplink transmission are not punctured. In a sixth aspect, alone or in combination with one or more of the first through fifth aspects, all resources for the configured uplink transmission are punctured.

In a seventh aspect, alone or in combination with one or more of the first through sixth aspects, the dynamic grant is transmitted at least a threshold quantity of symbols before the configured uplink transmission is scheduled. In an eighth aspect, alone or in combination with one or more of the first through seventh aspects, the threshold quantity of symbols is a fixed value or a value that is based at least in part on a numerology of a carrier. In a ninth aspect, alone or in combination with one or more of the first through eighth aspects, the threshold quantity of symbols is based at least in part on at least one of a type of the uplink transmission or a capability of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a user equipment (UE), comprising:
  receiving a dynamic grant for an uplink transmission that overlaps with a configured uplink transmission; and
  transmitting the uplink transmission punctured in the configured uplink transmission based at least in part on the dynamic grant, and based at least in part on a beam associated with the configured uplink transmission being subject to a maximum permissible exposure (MPE) condition.

2. The method of claim 1, further comprising:
  transmitting an indication that the beam is subject to the MPE condition.

3. The method of claim 1, wherein the uplink transmission is one of a physical uplink shared channel communication, an aperiodic sounding reference signal, or a physical random access channel communication.

4. The method of claim 1, wherein the configured uplink transmission is one of a periodic sounding reference signal (SRS), a semi-periodic SRS, a type-1 configured grant physical uplink shared channel communication, or a physical uplink control channel communication.

5. The method of claim 1, wherein only one or more symbols of the configured uplink transmission that overlap with the dynamic grant for the uplink transmission are punctured.

6. The method of claim 1, wherein all resources associated with the configured uplink transmission are punctured.

7. The method of claim 1, wherein the dynamic grant is received at least a threshold quantity of symbols before resources associated with the configured uplink transmission.

8. The method of claim 7, wherein the threshold quantity of symbols is a fixed value or a value that is based at least in part on a numerology of a carrier.

9. The method of claim 7, wherein the threshold quantity of symbols is based at least in part on at least one of a type of the uplink transmission or a capability of the UE.

10. A method of wireless communication performed at a network entity, comprising:
  outputting for a user equipment (UE) a dynamic grant for an uplink transmission that overlaps with a configured uplink transmission of the UE; and
  obtaining the uplink transmission in the configured uplink transmission based at least in part on the dynamic grant, and based at least in part on a beam associated with the configured uplink transmission being subject to a maximum permissible exposure (MPE) condition.

11. The method of claim 10, further comprising:
  obtaining an indication that the beam the UE is to use to transmit the configured uplink transmission is subject to the MPE condition.

12. The method of claim 10, wherein the uplink transmission is one of a physical uplink shared channel communication, an aperiodic sounding reference signal, or a physical random access channel communication.

13. The method of claim 10, wherein the configured uplink transmission is one of a periodic sounding reference signal (SRS), a semi-periodic SRS, a type-1 configured grant physical uplink shared channel communication, or a physical uplink control channel communication.

14. The method of claim 10, wherein only one or more symbols of the configured uplink transmission that overlap with the dynamic grant for the uplink transmission are punctured.

15. The method of claim 10, wherein all resources associated with the configured uplink transmission are punctured.

16. The method of claim 10, wherein the dynamic grant is outputted at least a threshold quantity of symbols before resources associated with the configured uplink transmission.

17. The method of claim 16, wherein the threshold quantity of symbols is a fixed value or a value that is based at least in part on a numerology of a carrier.

18. The method of claim 16, wherein the threshold quantity of symbols is based at least in part on at least one of a type of the uplink transmission or a capability of the UE.

19. A user equipment (UE) for wireless communication, comprising:
  one or more memories; and
  one or more processors coupled to the one or more memories, the one or more processors configured to cause the UE to:
  receive a dynamic grant for an uplink transmission that overlaps with a configured uplink transmission; and
  transmit the uplink transmission punctured in the configured uplink transmission based at least in part on the dynamic grant, and based at least in part on a maximum permissible exposure (MPE) condition of a beam associated with the configured uplink transmission.

20. The UE of claim 19, wherein the one or more processors are further configured to cause the UE to:
  transmit an indication that the beam is subject to the MPE condition.

21. The UE of claim 19, wherein the uplink transmission is one of a physical uplink shared channel communication, an aperiodic sounding reference signal, or a physical random access channel communication.

22. The UE of claim 19, wherein the one or more processors, to transmit the uplink transmission punctured in the configured uplink transmission, are configured to cause the UE to:

transmit the uplink transmission punctured in only one or more symbols of the configured uplink transmission that overlap with the dynamic grant for the uplink transmission.

23. The UE of claim 19, wherein the one or more processors, to transmit the uplink transmission punctured in the configured uplink transmission, are configured to cause the UE to:
transmit the uplink transmission punctured in all resources associated with the configured uplink transmission.

24. The UE of claim 19, wherein the one or more processors, to receive the dynamic grant, are configured to cause the UE to:
receive the dynamic grant at least a threshold quantity of symbols before resources associated with the configured uplink transmission.

25. The UE of claim 19, wherein the configured uplink transmission is one of a periodic sounding reference signal (SRS), a semi-periodic SRS, a type-1 configured grant physical uplink shared channel communication, or a physical uplink control channel communication.

26. A network entity for wireless communication, comprising:
one or more memories; and
one or more processors coupled to the one or more memories, the one or more processors configured to cause the network entity to:
output for a user equipment (UE) a dynamic grant for an uplink transmission that overlaps with a configured uplink transmission of the UE; and
obtain the uplink transmission in the configured uplink transmission based at least in part on the dynamic grant, and based at least in part on a maximum permissible exposure (MPE) condition of a beam associated with the configured uplink transmission.

27. The network entity of claim 26, wherein the one or more processors are further configured to cause the network entity to:
obtain an indication that the beam that the UE is to use to transmit the configured uplink transmission is subject to the MPE condition.

28. The network entity of claim 26, wherein the one or more processors, to obtain the uplink transmission in the configured uplink transmission, are configured to cause the network entity to:
obtain the uplink transmission in only one or more symbols of the configured uplink transmission that overlap with the dynamic grant for the uplink transmission.

29. The network entity of claim 26, wherein the one or more processors, to obtain the uplink transmission punctured in the configured uplink transmission, are configured to cause the network entity to:
obtain the uplink transmission punctured in all resources associated with the configured uplink transmission.

30. The network entity of claim 26, wherein the one or more processors, to output the dynamic grant, are configured to cause the network entity to:
output the dynamic grant at least a threshold quantity of symbols before resources associated with the configured uplink transmission.

* * * * *